United States Patent [19]

Sorensen

[11] Patent Number: 4,607,688
[45] Date of Patent: Aug. 26, 1986

[54] AUTOGENOUS SOLAR WATER HEATER

[76] Inventor: Wilfred B. Sorensen, 2, Cataraqui St., Kingston, Ontario, Canada, K7K 1Z7

[21] Appl. No.: 786,535

[22] Filed: Oct. 11, 1985

[51] Int. Cl.[4] .............................................. F28D 15/02
[52] U.S. Cl. ........................... 165/104.22; 165/104.22; 126/433; 126/434
[58] Field of Search .............................. 126/433, 434; 165/104.22, 104.22 A

[56] References Cited

U.S. PATENT DOCUMENTS 4,246,890  1/1981  Kraus et al. .......................... 126/433
4,478,211  10/1984  Haines et al. ......................... 126/433

FOREIGN PATENT DOCUMENTS 1146431  5/1983  Canada .

OTHER PUBLICATIONS

"Self Controlling, Self Pumping Heat Circulation System Study", G. P. Wachtell, FRC Report C4772-2, 7/1978, pp. 5-36 to 5-45.

Primary Examiner—Samuel Scott
Assistant Examiner—Allen J. Flanigan
Attorney, Agent, or Firm—Richard J. Hicks

[57] ABSTRACT

A bubble pump system capable of delivering heat from a higher to a lower position, particularly useful in a solar heating system is described, in which slugs of liquid and vapor are separated out in a separator and the vapor separated is cooled and condensed by indirect contact with a cooling medium. A splash guard is provided in the condenser to prevent liquid discharged from the liquid/vapor inlet from contacting the condensing medium.

3 Claims, 3 Drawing Figures

AUTOGENOUS SOLAR WATER HEATER

FIELD OF INVENTION

This invention relates to improvements in bubble-pump systems and, more particularly to systems capable of delivering heat from a igher to a lower position. In a bubble-pump system, heat is applied to the exterior of a tubular member which contains a volatile liquid. Vapour bubbles form in the liquid, and if the diameter of the tubular member is appropriately chosen, each bubble will extend across the width of the tubular member, thereby dividing the liquid column in the tubular member into separate slugs of liquid. When the tubular member is arranged in a liquid circuit, then the reduced average density of the fluid in the tubular member, compared with the average density of the fluid in other parts of the circuit, creates a pumping action with upflow of fluid through the tubular member. This pumping action can be used to deliver heat to a lower position within a closed loop system.

BACKGROUND OF INVENTION

There have been a number of prior proposals of bubble-pump systems. The following should be noted: U.S. Pat. No. 2,707,593 issued May 3, 1955 to Woodcock specifies the use of a conduit of such small dimensions laterally that the liquid therein will be vaporized to form vapour bubbles which fill the conduit from side to side, said bubbles being preceded and followed by slugs of hot liquid. U.S. Pat. No. 4,160,444 issued to Hamilton discloses two upwardly extending upflow heat collector conduits, subject to solar heating. Actually the heat collector conduits operate only one at a time in a cyclic manner. U.S. Pat. No. 4,237,866 issued to Rush describes a solar heater in which the discharge of mixed vapour and liquid from the heated passages is directed onto a heat exchange element extending through a combined header and heat exchanger. In the Rush device, however, heat is delivered from a higher position to a lower position by means of an externally powered circulating pump, whereas in the present invention heat is delivered autogenously. Reference is also made to my prior Canadian Patent No. 1,146,431 issued May 17, 1983 which describes a relatively simple bubble pump system upon which the present invention is based. Reference is also made to my U.S. patent application Ser. No. 275,917 filed June 22, 1981, now U.S. Pat. No. 4,552,208 claiming priority of the aforesaid Canadian patent.

OBJECT OF THE INVENTION

An object of the invention is the provision of a self-pumping bubble-pump system which is more effective than other known systems.

STATEMENT OF THE INVENTION

According to the present invention, a bubble-pump system comprises a heated tubular conduit disposed at a first higher elevation and extending upwardly from a lower input end to an upper output end, a vapour/liquid separator connected to said upper end, condensing means arranged to utilize a cooling medium to cool by indirect contact only vapour separated in the separator, an indirect heat transfer heat exchanger disposed at a second lower elevation, first pipe means arranged to supply both separated liquid and condensate from the vapour to the heat exchanger, second pipe means arranged to supply that separated liquid and condensate, after cooling in the heat exchanger, to the condensing means as said cooling medium, and third pipe means arranged to convey said cooling medium from the condensing means to said lower input end of the tubular conduit.

BRIEF DESCRIPTION OF THE DRAWINGS

The invention will now be described, by way of example, with reference to the accompanying drawings, in which.

DETAILED DESCRIPTION OF THE PREFERRED EMBODIMENT

Figure 1:
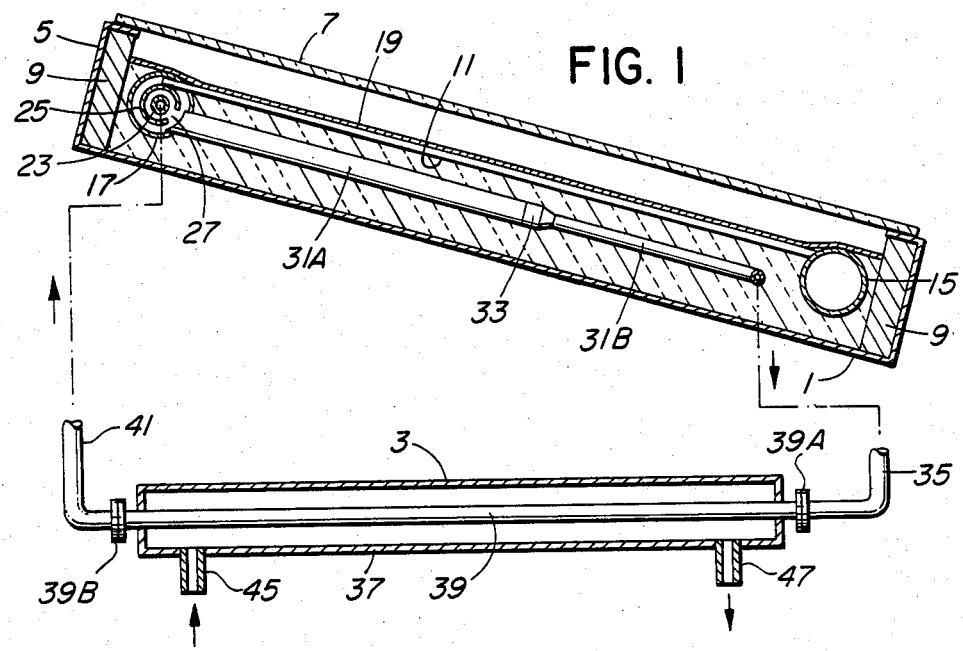
FIG. 1 is a schematic representation of a solar water heating installation, in the form of a sectional side elevation taken on the line I—I of FIG. 2 and as viewed in the direction indicated by the arrows.

The solar water heater shown in FIG. 1 comprises a liquid heating solar panel 1 disposed at a suitable elevation, typically on the roof of a building, where it can receive the sun's rays in a relatively unobstructed manner, and a liquid/water heat exchanger 3 arranged at a lower level, typically in the basement of the building. The solar panel is in the form of a shallow rectangular box and comprises an open topped casing 5 with its top covered by a sheet 7 of suitable glazing material, such as glass or transparent plastic material. The sides and back of the casing are provided on their insides with heat insulation 9 to inhibit the escape of heat developed inside the casing 5 by sun's rays which pass through glazing sheet 7.

As will be seen from FIG. 1, the box-like casing 5 is inclined at a selected angle to the horizontal and inside the casing are arranged five liquid boiling tubes 11, also inclined at the same angle to the horizontal. It will be appreciated that the most advantageous angle varies with the latitude of the collector location and may also be adjustable with the season. At their lower ends, these tubes 11 are connected to a lower supply header 15, and at their upper end they are arranged to extend into an upper part of a sheet metal cylindrical separator 17. A sheet metal absorber plate 19 is secured in a heat-exchanging manner to each of the tubes 11, and extends over the whole width and length of the casing 5.

Figure 2:
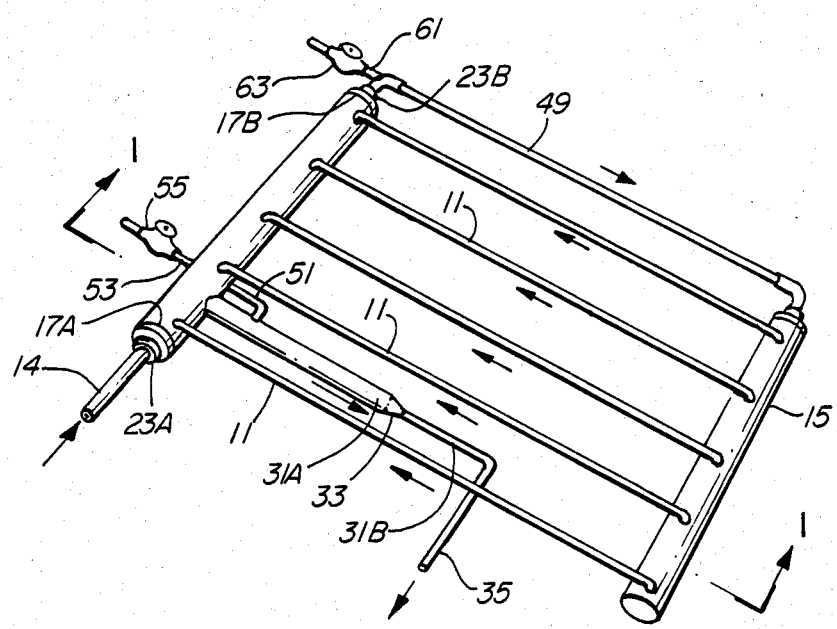
FIG. 2 is an isomeric view of the tubular parts only of a solar liquid heater forming part of the installation shown in FIG. 1.
Figure 3:
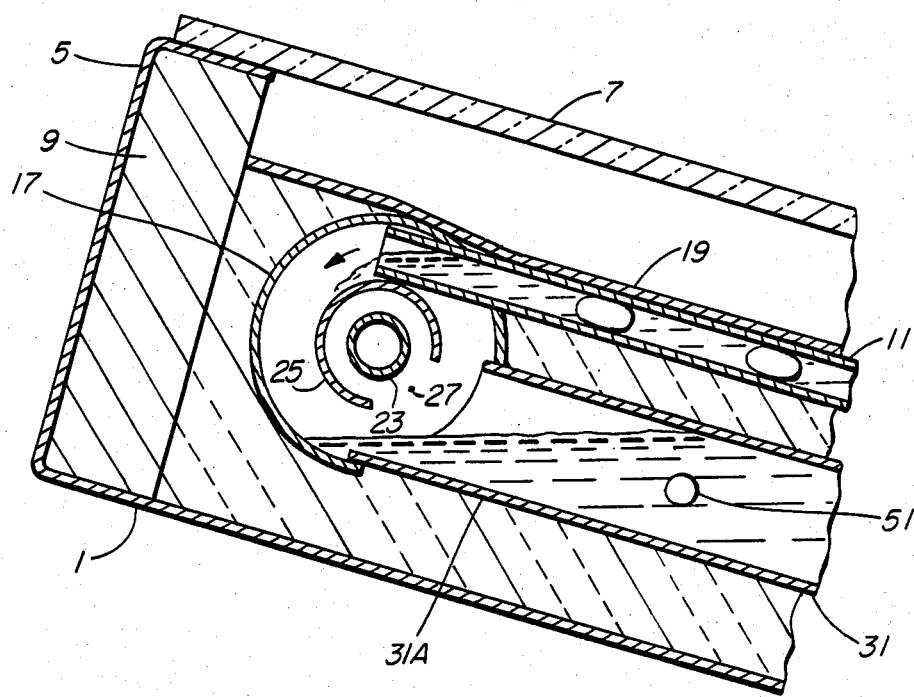
FIG. 3 shows the upper left-hand end only of FIG. 1, drawn to a much larger scale.

A condensing tube 23 extends axially of the separator 17 and through its two end plates 17A and 17B. Interposed between the wall of the separator and this condensing tube 23 is a sheet metal splash guard 25, which is positioned below the discharge ends of boiling tubes 11 and is in the form of an incomplete cylinder having an axially extending arcuate opening 27. This opening 27 is preferably disposed in the lower quadrant relative to the condensing tube 23 as shown in FIG. 3. Connected to the lower part of the separator 17 is a downflow tube 31 which over its upper parts has about six times the cross flow area of one of the boiling tubes 11. At its mid-length, a transition piece 33 (see FIGS. 2 and 4) serves to connect upper part 31A with a lower part 31B of about half the cross sectional area.

Outside the casing 5 this lower part 31B is connected (see FIG. 1) to a "hot line" consisting of a pipe 35 connected to an inlet 39A of heat exchanger 3 for heated liquid. This heat exchanger comprises an outer shell 37 containing a heat exchange element 39 provided with said inlet 39A and with an outlet 39B which is connected by a "cold line" pipe 41 to the inlet end 23A of the condensing tube 23 (see FIG. 2). The space between shell 37 and the heat exchange element 39 in use contains domestic water to be heated entering the shell 37 through a water inlet 45 and leaving the space through a hot water outlet 47. The outlet end 23B of the condensing tube 23 is connected by a pipe 49 to the supply header 15.

It will be seen from FIG. 3 that the downflow tube 31 is provided near its upper end with a "level set" port 51 (see FIG. 2) connected by a pipe 53 to a valve 55 through which water or other suitable operating liquid can be fed into, and surplus liquid vented from, the tubulous parts of the solar panel. A further vent pipe 61 provided with a valve 63 is connected to the upper end of pipe 49.

In use of the installation shown in the drawings, first the tubulous parts are filled with a suitable liquid, which may be water but can be any liquid having suitable physical properties such as boiling point and resistant to freezing in colder climates. This filling can be effected through valve 55, air being vented from the system through valve 63. Then, with valve 63 closed, liquid is withdrawn from the system through valve 55 to reduce the initial pressure to less than atmospheric. In this way a desired reduced boiling temperature can be achieved.

When the solar panel 1 is subjected to heating by the rays of the sun, the liquid in the boiling tubes 11 will become heated. After a time the temperature in the boiling tubes 11 will be such that bubbles of vapour will form separating the fluid in the tubes into slugs of water thereby producing an effective pumping action.

For continued operation of the installation, it is necessary that the vapour so produced be condensed. With the arrangement shown, the mixture of vapour and liquid flows down through the space between the wall of separator 17 and the splash guard 25. However, only the vapour can enter the space between the condensing tube 23 and the splash guard 25 through the opening 27. As a result, liquid discharged by the boiling tubes 11 enters downflow tube 31 without cooling, that is without losing its latent heat, and is joined by liquid condensate dripping down from the condensing tube 23.

It will be noted that in FIG. 3 the level of the liquid in the bottom of the separator 17 and the top of downflow tube 31 is higher than the "level set" port 51. This is due partly to the expansion of the liquid in the system as it is heated, but mostly because of the formation of vapour bubbles in the boiling tube.

At night, when in the absence of solar heat the upper part of the solar panel 1 cools off, the situation arises that the liquid in downflow tube 31 is hotter than the liquid in the boiling tubes 11. In order to avoid the risk that, with decreasing pressure in the liquid system, vapour bubbles will form in the still warm downflow tube 31, the upper part 31A of that tube is made, as shown, of sufficiently large diameter that any bubbles which form in tube 31 will escape upwardly through the water in the tube without setting up any "bubble-pump" action. Reverse flow in the system is thus inhibited by the maintenance of a vapour break between the top of tube 31 and the upper ends of boiling tubes 11. Transition piece 33 is provided so that an early return to piping of smaller diameter and thus lower heat loss can be effected.

From a study of FIG. 3, it will be clear that the present invention provides an arrangement in which contact of heated liquid, discharged by the boiling tubes 11, with the condensing tube 23 is completely eliminated which is in complete contrast to both the Woodstock device described in U.S. Pat. No. 2,707,593 and the Rush device described in U.S. Pat. No. 4,237,866 supra. As a result only the latent heat released by condensation of the vapour on tube 23 is transferred to the liquid flowing towards the supply header 15. This ensures that the temperature of absorber plate 19 is as low as possible thereby reducing reradiation, conductive and convective losses through glazing 7 to the surroundings. The arrangement of the parts at the separator 17 tends to provide a vapour break in the system in this locality to inhibit reverse flow of liquid during night periods, and this feature is promoted by the use of a downflow tube 31 which, over at least an upper part of its length 31A, is of sufficient diameter to prevent the formation of bubble-pump action and therefore a loss of heat from the storage tank.

What I claim is:

1. A bubble-pump system comprising a heated tubular conduit disposed at a first higher elevation and extending upwardly from a lower input end to an upper output end, a vapour/liquid separator connected to said upper end, condensing means arranged to utilize a cooling medium to cool by indirect contact only vapour separated in the separator, an indirect heat transfer heat exchanger disposed at a second lower elevation, first pipe means arranged to supply both separated liquid and condensate from the vapour to the heat exchanger, second pipe means arranged to supply that separated liquid and condensate, after cooling in the heat exchanger, to the condensing means as said cooling medium, and third pipe means arranged to convey said cooling medium from the condensing means to said lower input end of the tubular conduit; wherein the vapour/liquid separator is in the form of a horizontally extending cylinder, the heated tubular conduit is arranged to discharge a mixture of liquid and vapour substantially tangentially into the cylinder at or near its upper level, the condensing means extending axially of the separator, and a splash guard is interposed between the condensing means and the cylinder and is so shaped and positioned as to prevent liquid discharged by the heated tubular conduit from contacting the condensing means.

2. A bubble-pump system as claimed in claim 1, in which several similar heated tubular conduits are connected in parallel with said heated tubular conduit and are similarly arranged to discharge a mixture of liquid and vapour substantially tangentially into the cylinder at or near its upper level.

3. A bubble-pump system as claimed in claim 1, in which a downflow pipe connects the lower part of the separator with said first pipe means, and the downflow pipe is of sufficient diameter to ensure that any bubbles of vapour forming therein are too small to bridge the cross section of the downflow pipe and thus initiate upward bubble-pumping in the downflow pipe.

* * * * *